United States Patent [19]

Froning et al.

[11] Patent Number: 4,956,066

[45] Date of Patent: Sep. 11, 1990

[54] DEVICE FOR CARRYING OUT FIELD SUPPORTED ION EXCHANGE IN PLANE-PARALLEL PLATES

[76] Inventors: Edilbert A. K. Froning, Am Fohrenbuhle 12, 7777 Salem; Klaus A. Langner, Alte Dorfstrasse 61, 7777 Uberlingen, both of Fed. Rep. of Germany

[21] Appl. No.: 304,496

[22] Filed: Jan. 31, 1989

[30] Foreign Application Priority Data

Feb. 1, 1988 [DE] Fed. Rep. of Germany ....... 3802837

[51] Int. Cl.$^5$ .............................................. C03C 21/00
[52] U.S. Cl. ................................ 204/243 R; 204/247
[58] Field of Search ................... 204/247, 180.1, 182.2, 204/299 R, 130, 243 R; 65/30.13

[56] References Cited

U.S. PATENT DOCUMENTS 3,607,684  9/1971  Kuhn ................................... 204/247
4,786,391  11/1988  Clemens .............................. 204/247

Primary Examiner—John F. Niebling
Assistant Examiner—Arun S. Phasge
Attorney, Agent, or Firm—Lee, Mann, Smith McWilliams & Sweeney

[57] ABSTRACT

Zones having an increased refractive index shall be created as optical wave guides, or the like, in plane-parallel plates by ion exchange from a salt melting. For this purpose the plate is clamped between two holding bodies made of metal. The holding bodies form cavities (26,28) on both sides of the plate. These cavities are open towards the plate. The cavities are surrounded by closed sealing surfaces engaging the plate. Reservoirs for the salt melting communicate through filling conduits with the lower ends of the cavities. Vent conduits extend from the cavities.

2 Claims, 2 Drawing Sheets

DEVICE FOR CARRYING OUT FIELD SUPPORTED ION EXCHANGE IN PLANE-PARALLEL PLATES

TECHNICAL FIELD

The invention relates to a device for carrying out field supported ion exchange in plane-parallel plates particularly for providing optical wave guides, comprising
  (a) holding bodies having a aligned cavities for accomodating a salt melting, said holding bodies being arranged to hold the plane-parallel plate in vertical orientation such that the planar surfaces of the plate are adjacent to said cavities,
  (b) sealing means between the holding bodies and the plate whereby sealing between the holding bodies and the adjacent surfaces of the plate along the entire circumference of the surface portions in contact with the salt melting is accomplished, and
  (c) an anode and a cathode which are arranged to have a voltage applied thereto for generating an electric field extending through the melting and the plate.

BACKGROUND ART

It is known to produce optical wave guides in plane-parallel plates, wherein light is guided by total reflection (DE-A-28 34 344). For this purpose, structures which have a refractive index which is higher than the refractive index of the material fo the plate have to be generated in the plane-parallel plates. It is known to generate such an increased refractive index in that a ion exchange is effected in the material. With ion exchange, ions in the material of the plate are replaced by ions having a larger ion radius. The surface of the plate is covered by a mask, except for such areas in which the refractive index shall be increased. The plate is heated up and is brought into contact with appropriate substances. Then, a ion exchange is accomplished and thus an increase of the refractive index in the areas not covered by the mask.

U.S. Pat. application No. 3,857,689 describes the production of an integrated optical circuit in which a mask which determines the desired optical pattern is applied to a plane-parallel plate (substrate). Then, the plate is moved to a bath of salt melting. This salt melting contains monovalent positive ions having a higher influence on the refractive index than the positive ions in the material of the plate. It is ensured that a ion exchange takes place whereby positive ions of the plate are replaced by ions of the salt melting. This causes an increase of the refractive index in the surface layer areas which are not covered by the mask and which are exposed to the salt melting.

Form Japanese patent application No. 58-118 609, it is known to support the ion exchange by applying an electric field. In the method described there a mask and then a thin silver layer is applied to a plane-parallel plate by sputtering. An anode made of chromium is attached to the silver layer. A cathode made of aluminum is provided on the opposite side. The plate is heated and, at the same time, a voltage is applied across the anode and the cathode. By the electric field silver iones are transported into the material of the plate. Thereby, in the areas not covered by the mask, an optical wave guide is generated having a higher refractive index as compared to the plate.

Furthermore, it is known to hold a plane-parallel plate which shall be provided with wave guides in horizontal position by a suction bell connected to a vacuum. The suction beel contains a supply of salt melting. The side of the plane-parallel plate opposite the suction bell is provided with a mask. This side of the plate is immersed into a further supply of the salt melting. An electric field is applied through electrodes to the salt melting. Here, also positive iones having a larger diameter diffuse from the supply of salt melting into the plate and thereby generate optical wave guides with an increased refractive index in the non-covered areas, whereas, on the other hand, on the upper side of the plate ions having a smaller diameter diffuse from the material of the plate into the salt melting. It is also known to provide a ring instead of a suction bell. A glass plate with a surface to be treated is bonded to said ring (German patent application No. 20 44 481, FIG. 1).

In practical work it becomes obvious that a close engagement of the plate with the sealing surface of the suction bell cannot be achieved with plates which are not circular since under the action of the vacuum the plates are deformed cushion-like. Besides, the operation of these prior art devices is complicated.

Furthermore, it is known to hold a plane-parallel plate vertically. Cups are provided with suitable sealing surfaces on both sides of the plate such that cavities are formed on both sides of the plate each of which is limited on a vertical side face by the surface of the plate and is open at the top. Salt melting is filled into these cavities. The cups are provided with an anode and a cathode, respectively, such that an electric field is generated through the salt melting and the plate. On the side of the anode the plate is again provided with a mask (U.S. Pat. No. 3,627,491).

This prior art arrangement involves the risk that by adhesive forces the salt melting creeps over the edge of the panel projecting above the salt melting and causes a short circuit.

From German patent application No. 20 44 481 a method for treating the surfaces of plane-parallel plates made of glass by ion exchange is known. In this prior method of glass by ion exchange is known. In this prior method the plane-parallel plate is held in vertical arrangement between two holding bodies. The two holding bodies are provided with aligned cavities for accommodating the salt melting. The planar surfaces of the plates are adjacent to said cavities. Sealing means are provided between the holding bodies and the plate and ensure sealing between the holding bodies and the adjacent surfaces of the plate along the entire circumference of the surface portions in contact with the salt melting. An anode and a cathode extend into the salt melting and are arranged to have a voltage applied thereto for generating an electric field extending through the melting and the plate.

The holding bodies of German patent application No. 20 44 481 are formed by L-shaped hollow bodies which are open at both ends. A vertical leg has a smaller cross-section than a horizontally arranged leg the cross-section of which is adapted to the shape of the plate to be treated. The plate is held between the end faces of the horizontal leg and is bonded thereto. The salt melting is filled into the cavities thus formed on both sides of the plate.

DISCLOSURE OF THE INVENTION

It is the object of the invention to provide a device for carrying out field supported ion exchange in plane-parallel plates which can be easily operated, which can be used with any shape of the plates, also non-circular shapes, and which safely prevents short circuits due to creeping of the salt melting.

According to the invention, based on a device of the above defined type, this object is achieved in that (d) the cavities are formed in opposite, vertical planar side faces of the two holding bodies, and the plane-parallel plate is held between these planar side faces, (e) each of the sealing means is formed by a sealing surface which closely engages the plate and extends all around the periphery of the plate, (f) each cavity communicates through a filling supply conduit ending at the lower end of the cavity with a reservoir open at the top for the salt melting, and (g) a vent conduit extends from the upper end of each cavity to the upper portion of the reservoir.

In this way the plane-parallel plate is safely held between the aligned sealing surfaces of the two holding bodies. The sealing surfaces can be adapted to the shape of the plate. Therefore, any desired type of plates can be processed by a suitable design of the holding bodies. Since the sealing surfaces extend all around the periphery of the plate, the salt melting contained in the cavities cannot creep along the surface of the plate, and, as in the prior art device mentioned above, cause an electrically conductive connection between the salt meltings on both sides of the plate. The arrangement of the reservoirs and vent conduits ensure that, when the reservoirs are filled, also the cavities are always filled with salt melting. The vertical arrangement of the plate ensures that bubbles cannot stick to the plate as with horizontal arrangement of the plates. Such bubbles in the salt melting can locally affect the ion exchange.

It is advantagous when the holding bodies are made of an electrically conductive material and are insulatedly held and the voltage can be supplied directly to the holding bodies.

An embodiment of the invention with a modification will now be described in further detail with reference to the accompanying drawings:

PREFERRED EMBODIMENT OF THE INVENTION

Figure 1:
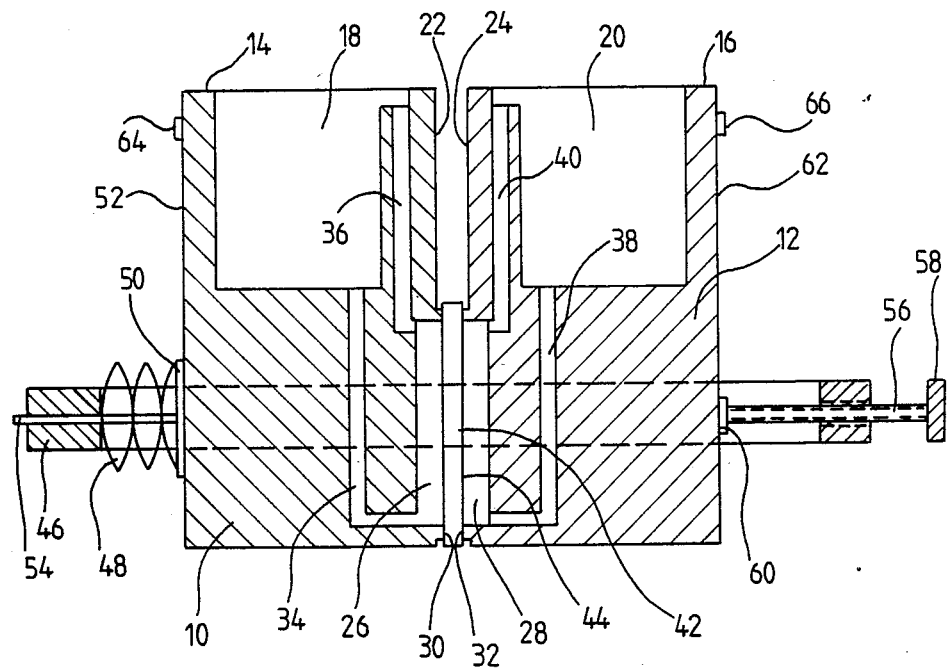
FIG. 1 shows schematically a longitudinal section through a device for carrying out a ion exchange in a plane-parallel plate.

The device comprises two substantially identical holding bodies 10 and 12. The holding bodies 10 and 12 are substantially cuboidal. At their upper end faces 14 and 16 each of the two holding bodies 10 and 12, respectively, is provided with a reservoir 18 and 20, respectively, for a salt melting. The reservoirs 18 and 20 are open at the top.

The opposite side faces 22 and 24 of the holding body 10 and 12, respectively, are provided with recesses which form cavities 26 and 28, respectively. Sealing surfaces 30 and 32, respectively, are formed all around the cavities 26 and 28. The sealing surfaces 30 and 32 are machined very accurately to be planar. The sealing surfaces 30 and 32 project slightly beyond the side faces 22 and 24, respectively.

The cavity 26 communicates through a filling supply conduit with the reservoir 18. The filling supply conduit 34 extends from the bottom of the reservoir 18 to the lower end of the cavity 26. A vent conduit 36 extends from the upper end of the cavity 26. The vent conduit 36 is guided along the wall of the reservoir 18 and ends in the upper portion of the reservoir shortly below its upper edge, i.e. its upper end face 14.

Similarly the cavity 28 communicates through a filling supply conduit 38 with the reservoir 20. The filling supply conduit 38 extends from the bottom of the reservoir 18 to the lower end of the cavity 28. A vent conduit 40 extends from the uper end of the cavity 28. The vent conduit 38 is guided along the wall of the reservoir 20 and ends in the upper portion of the reservoir shortly below its upper edge, i.e. its upper end face 16.

The bottom of the reservoir 18 and 20 is located above the upper end of the cavities 26 and 28, respectively. This ensures that the cavities 26 and 28 are filled to their tops with salt melting as long as there is still salt melting in the reservoir 18 or 20, respectively.

A plane-parallel plate 42 is held between the two holding bodies 10 and 12. The plate 42, on its side facing the holding body 12, the right hand side of the figure, is provided with a mask 44 made of a material which prevents ion exchange in the areas covered by the mask 44. The sealing surfaces 30 and 32 closely engage the surfaces of the plate 12.

The two holding bodies are made of an electrically conductive material, namely metal, In the illustrated embodiment they are held together by a clamp 46. On the left hand side FIG. 1, the clamp 46 is supported by a set of disc springs 48 which through an insulation engage the side face 52 of the holding body 10 opposite the side face 22. A center pin 54 arranged on the insulation 50 provides for the centering of insulation 50, disc springs 48 and clamp 46.

On the opposite side, a threaded spindle 56 is guided in the clamp 46. This spindle can be adjusted by means of an adjusting knob 58. This threaded spindle 56 engages the side face 62 of the holding body 12 opposite the side face 24 through an insulating element 60. In this way the two holding bodies 10 and 12 are pressed with a well-defined force against the plate 42. The threaded spindle allows adjustment of this compression force. The disc springs 48 prevent the compression force from becoming too strong, which might lead to a damage of the plate 42.

The holding body 10 is connected to the negative terminal 64 of a voltage source and therefore is a cathode. The holding body 12 is connected to the positive terminal 66 of the electric supply source and forms the anode.

The device described operates as following:

The plate 42 is clamped between the two holding bodies 10 and 12. The sealing surfaces 30 and 32 of the holding bodies 10 and 12, respectively, engage the surfaces of the plate 42 on opposite sides along the edges of the plate. The sealing surfaces 30 and 32 are aligned such that no transverse moments at can become effective on plate 42. Therefore, the plate cannot be deformed cushion-like as in prior art devices. Therefore, the sealing surfaces can be pressed to the surface of the plate 42 with sufficient force by the threaded spindle 56 and the springs 48 such that safe sealing is achieved all around the plate.

The reservoirs 18 and 20 are filled with a salt melting which contains the positive ions which shall be exchanged for other ions in the material of the plate 42. This salt melting flows through the filling conduits 34 and 38 into the cavities 26 and 28, respectively. The air from the cavities 26 and 28 emerges through the vent conduits 36 and 40, respectively. Therefore, unobjectionable filling of the cavities with the salt melting without generation of bubbles is ensured. The cavities 26 and 28 are closely sealed. Therefore, no salt melting can creep along the surface of plate and provide a conductive connection between the two sides of the plate 42, as in other prior art arrangements.

A voltage is applied across the holding bodies 10 and 12 such that positive iones migrate under the influence of the electric field from the salt melting in the reservoir 20 in the areas left free by the mask 44 through the plate 42 heated also and displace iones having a smaller ion diameter which, in turn, pass on into the salt melting in the cavity 26. Structures, particularly wave guides, having an increased refractive index compared to the material of the plate 42 are generated in the areas left free by the mask 44.

Figure 2:
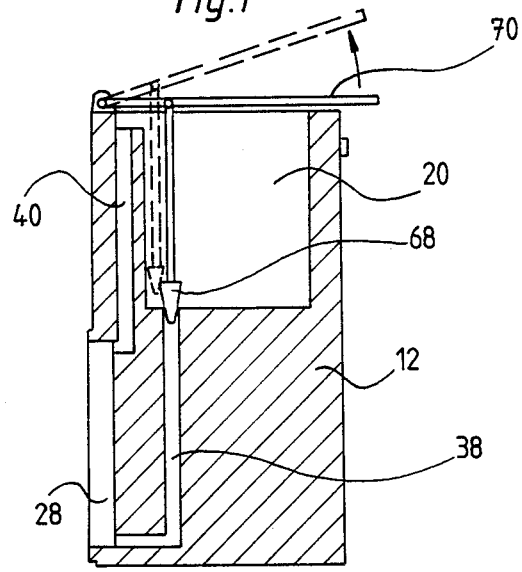
FIG. 2 shows a side elevation of a holding body in the device of FIG. 1 wherein the filling conduit is arranged to be closed by a plug until the exchange temperature is achieved.
Figure 4:
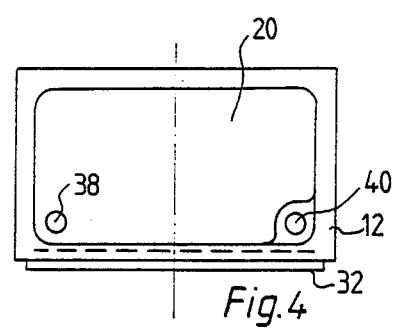
FIG. 4 shows a plan view of the holding body of FIGS. 2 and 3.

In order to achieve well-defined timing of the field supported ion exchange the melting preferably is not brought into contact with the glass substrate already during the start-up phase of the furnace. The start-up phase is the time from reaching the melting temperature of the melting to reaching the actual exchange temperature. To this end, as indicated in FIG. 2, the filling conduit 38 is, at first closed by a kind of plug 68. The plug 68 can be removed by a mechanism 70 as schematically indicated in FIG. 2. The plug is a simple cone made of the same material as the rest of the apparatus itself. The plug is slightly pressed in for sealing.

The plug 68 is removed when the exchange temperature is achieved and immediately before the field is applied.

Figure 6:
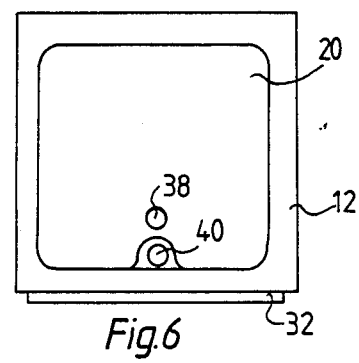
FIG. 6 is a plan view of the holding body of FIG. 5.
Figure 3:
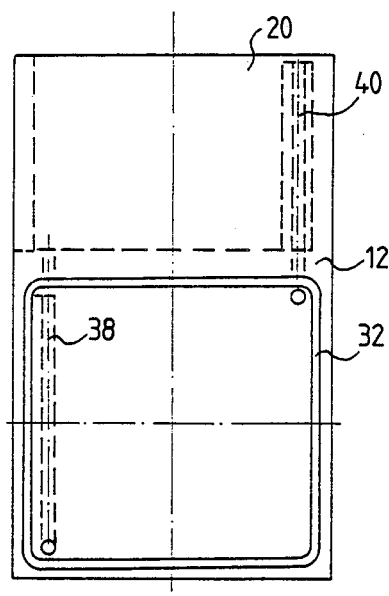
FIG. 3 shows a view of a holding body in the device of FIG. 1, taken from the side of the plate which is to be processed, or viewed from the left in FIG. 2.
Figure 5:
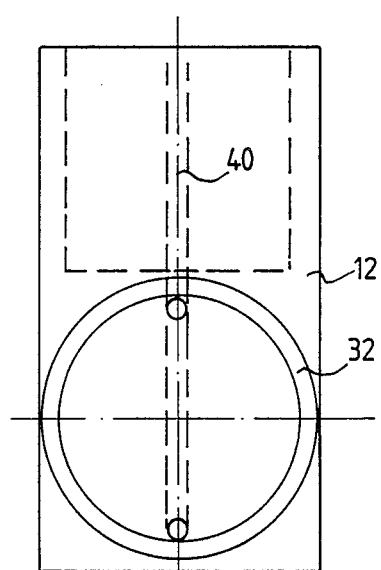
FIG. 5 shows a view similar to FIG. 3, of a holding body for use with circular plates.

FIGS. 5 and 6 show a modified embodiment of the holding bodies. Corresponding elements are designated in FIGS. 5 and 6 by the same numerals as in FIG. 1. In the holding body 10 according to FIGS. 5 and 6 the sealing surface 30 is not rectangular as in FIG. 3 but circular. Besides, the filling conduit 34 and the vent conduit 36 are both arranged in the longitudinal central plane of the holding body 10.

We claim:

1. A device for achieving field-ion exchange between plane-parallel glass plates and molten salts in the process of making optical waveguides, comprising a pair of holding bodies of electrically conductive material having side faces facing each other, cavities in said side faces, and planar sealing surfaces surrounding said cavities, said holding bodies, in operation being arranged vertically to hold the plane-parallel glass plate therebetween with said sealing surfaces sealing engaging said glass plate on opposite sides thereof, each of said holding bodies having a substantially horizontal top face with a recess therein open to the top, said recesses being reservoirs adapted to accommodate molten salt, the bottom of said recess being located above the upper end of said cavity, a filling supply conduit for connecting said recess with said cavity, said filling supply conduit extending from the bottom of said recess to the lower end of said cavity, and a vent conduit extending from the upper end of said cavity to said top face of said holding body, said holding bodies being supported through electrically insulating means and being arranged to be connected to the negative and positive terminals, respectively of an electric power source.

2. A device as claimed in claim 1, and further comprising removable plug means for closing said filling supply conduits.

* * * * *